US008958854B1

(12) United States Patent  
Morley et al.

(10) Patent No.: US 8,958,854 B1
(45) Date of Patent: Feb. 17, 2015

(54) DYNAMIC BATTERY SAVER FOR A MOBILE DEVICE

(75) Inventors: Dorothy Beau Morley, Wakefield, MA (US); Yuk Li, Morganville, NJ (US); Damodar Bhandarkar, Foxboro, MA (US); Joel Angiolillo, Weston, MA (US)

(73) Assignee: Cellco Partnership, Basking Ridge, NJ (US)

( * ) Notice: Subject to any disclaimer, the term of this patent is extended or adjusted under 35 U.S.C. 154(b) by 531 days.

(21) Appl. No.: 13/188,820

(22) Filed: Jul. 22, 2011

(51) Int. Cl.
*H04B 1/38* (2006.01)

(52) U.S. Cl.
USPC ........ 455/574; 455/343.5; 455/418; 455/432; 370/311; 712/15; 713/340

(58) Field of Classification Search
CPC .............................. H04W 52/00; H04W 52/02
USPC ............... 455/574, 343.5, 432, 418; 370/311; 712/15; 713/340
See application file for complete search history.

(56) References Cited

U.S. PATENT DOCUMENTS

| 6,697,953 | B1* | 2/2004 | Collins ......................... 713/320 |
| 7,274,929 | B1* | 9/2007 | Banginwar ................... 455/418 |
| 7,583,951 | B2* | 9/2009 | Gibbs ......................... 455/343.5 |
| 8,386,826 | B2* | 2/2013 | Newman ....................... 713/340 |
| 2011/0071780 | A1* | 3/2011 | Tarkoma ......................... 702/63 |
| 2012/0244805 | A1* | 9/2012 | Haikonen et al. ............ 455/41.2 |
| 2013/0074077 | A1* | 3/2013 | Miller et al. ................. 718/100 |

* cited by examiner

*Primary Examiner* — Amancio Gonzalez

(57) ABSTRACT

A user can manage battery consumption of a mobile device using a mobile device battery management program which provides improved battery management functions, such as a dynamic battery use estimator, a battery threshold manager, and a profile based battery manager. Using the dynamic battery use estimator, the user can input different configuration settings of the mobile device and get estimates of the projected remaining battery life for the inputted configuration settings before applying any change to the operational configuration setting. The battery threshold manager allows the user to select a trigger and set its associated condition for turning off at least one application, service, or component of the mobile device when the condition is reached. Using the profile based battery manager, the user can select one of multiple profiles and set the mobile device to operate in an operational configuration setting corresponding to the selected profile.

20 Claims, 12 Drawing Sheets

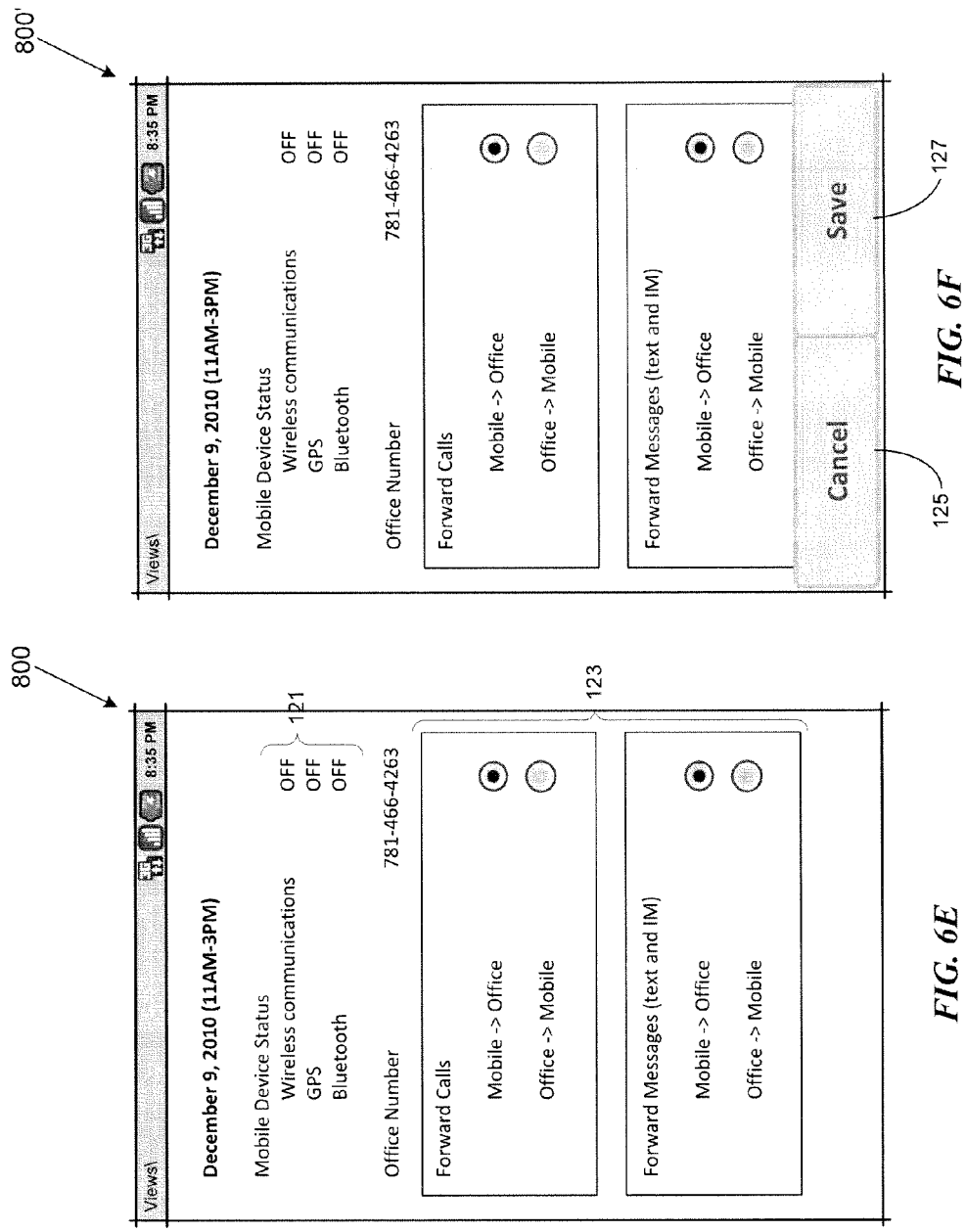

DYNAMIC BATTERY SAVER FOR A MOBILE DEVICE

TECHNICAL FIELD

The present subject matter relates to techniques and programming to provide a graphical user interface to allow a user to manage battery consumption of a mobile device.

BACKGROUND

In recent years, mobile communication services have expanded and increased in popularity around the world. Many advanced networks offer wireless mobile communication service for voice calls, mobile messaging (e.g. text and/or multimedia-based messaging) and data communications. Increasingly, many users opt for smartphone-type mobile devices that support these various types of communications as well as a variety of standalone application functions within one device. More recently, other types of mobile devices, such as book readers and tablet computers, have been adapted to have integral mobile communication capabilities, and thus offer even more sophisticated mobile device capabilities and functionality.

Increased mobile device functionality, for example, the use of certain types of transceivers, larger displays, a global positioning satellite (GPS) receiver, or the like, comes at a cost: it increases the power consumption of the mobile device. Features (or circuitry) supporting multimedia-based applications, like faster processors, bigger displays, and higher bandwidth transceivers, all correlate with higher battery consumption.

Mobile device form factors range from traditional feature phones to sophisticated smartphones and tablets with many of these features and power consuming components. The small form factors of mobile devices place constraints on the size of batteries that such mobile devices can utilize. Although batteries continue to evolve, the capabilities of small batteries that can be utilized in a mobile device tend to limit the battery usage time between charges for the mobile device. On the other hand, there is a continuing desire for increased battery life between charging cycles.

More applications to manage and more settings to control mean that the user interface on these mobile devices is becoming more and more complex. Many users are, however, not even aware of what consumes their battery power, and if they are, they often do not know how to optimize battery settings for their personal situations. To make matters worse, most mobile devices do not have very sophisticated, native battery management tools. If provided at all, such tools often make estimates of battery level that are not very granular or accurate.

New chips (or integrated circuits) that closely monitor power consumption of mobile devices have recently become available. These new chips, sometimes referred to as "fuel gauge" chips for batteries, greatly increase the accuracy of battery level estimation and are starting to enter the market as their price per unit become affordable to mobile device manufacturers.

While these new chips are starting to hit the market and the needs of consumers in the area of mobile device battery management are expanding, controls available through the device user interface are still very basic and limited. User interfaces that visualize battery consumption and provide solutions to increase efficiency in battery management are not readily available to users.

As an illustration, FIGS. 1A and 1B show a couple of screens of an existing user interface available in Android based mobile devices today. As illustrated in FIG. 1A, the user interface allows a user to view various applications and services that are currently running on an Android based mobile device. Also, the user can see battery usage of each application and/or service. In addition, if desired, the user can select an application or service that is running and from a screen like that of FIG. 1B, can forcibly stop or uninstall the selected application or service. However, the user cannot predict the effect of terminating a particular application or service on estimated battery life of the mobile device. Further, the user interface requires the user to access battery management functions only through settings of the mobile device; and thus in order to access the battery management functions, the user must navigate through various setting screens.

Hence, there is room for still further improvement in providing battery management functions for mobile devices and associated graphical user interfaces.

SUMMARY

The present teachings herein alleviate one or more of the above noted problems and provide improvements in a user's ability to manage battery consumption of a mobile device, via techniques and programming provided by a graphical user interface on the mobile device. The user's ability to manage the battery consumption of the mobile device is improved via various battery management functions. The user can predict the effect of terminating various running applications, services, and/or components on estimated battery life of the mobile device and manage the battery consumption through triggers and/or profiled-based battery management functions. In the examples in the detailed description, graphical user interfaces provide one or more tools for such improved management of the battery power consumption of the mobile device.

As a result, a user of a mobile device can manage battery power consumption of the mobile device, through various battery management functions provided by a mobile device battery management program (or application) which includes a dynamic battery use estimator, a battery threshold manager, and/or a profile based battery manager.

Any of the concepts may take the form of a mobile device and software for implementing various battery management functions of the mobile device battery management program. A software product, in accord with this concept, includes at least one machine-readable medium and information carried by the medium. The information carried by the medium may be executable program code, one or more databases and/or information regarding implementation of various mobile device battery management functions.

In an example, the mobile device battery management program provides a user of a mobile device with a graphical user interface, via a display and a user input element of the mobile device, for improved battery management functions. The dynamic battery use estimator allows the user to input different configuration settings and see outputs of estimates of projected remaining battery life based on the different configuration settings. When a configuration setting of the mobile device is selected by the user, the mobile device battery management program sets the mobile device to operate in an operational configuration setting which corresponds to the selected configuration setting.

In another example, the battery threshold manager allows the user to select a trigger from among a plurality of triggers. After the user selects the trigger, the user sets a condition for the selected trigger, and selects at least one application, service, or component of a mobile device impacting power consumption from a battery of the mobile device. The mobile device battery management program monitors operation of the mobile device in relation to the selected trigger until the condition is reached. When it is determined that the selected trigger condition is met, the mobile device battery management program indicates this to the user and/or turns off the selected application, service or component of the mobile device.

In a further example, battery consumption of the mobile device can be managed with minimal intervention by the user through the profile based battery manager. The profile based battery manager allows the user to select one of a plurality of operational profiles of usage of a mobile device. Each operational profile corresponds to a different operational configuration setting of the mobile device impacting power consumption from a battery of the mobile device. The user can select one of the operational profiles, and the mobile device battery management program sets the mobile device accordingly to operate in an operational configuration setting corresponding to the selected operational profile.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 6A-6F illustrate an exemplary implementation of a battery threshold manager and associated graphical user interfaces.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1B:
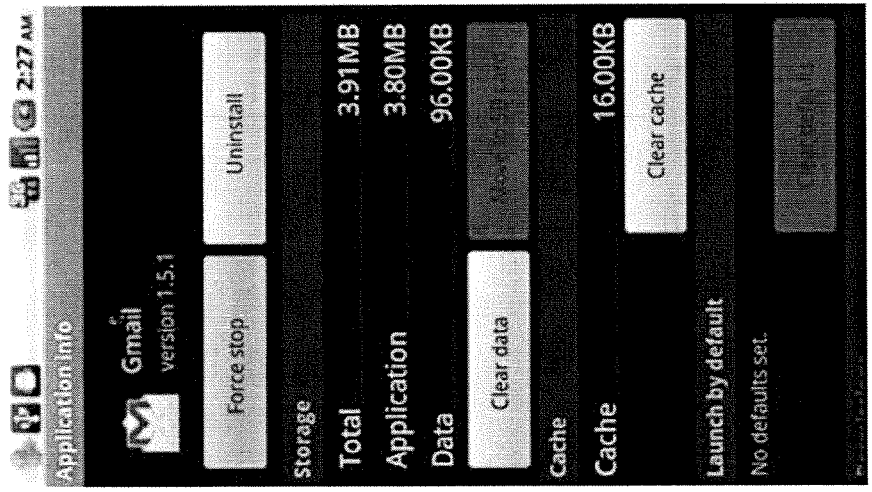
FIGS. 1A and 1B illustrate existing graphical user interfaces for existing battery management functions for Android based mobile devices.
Figure 1A:
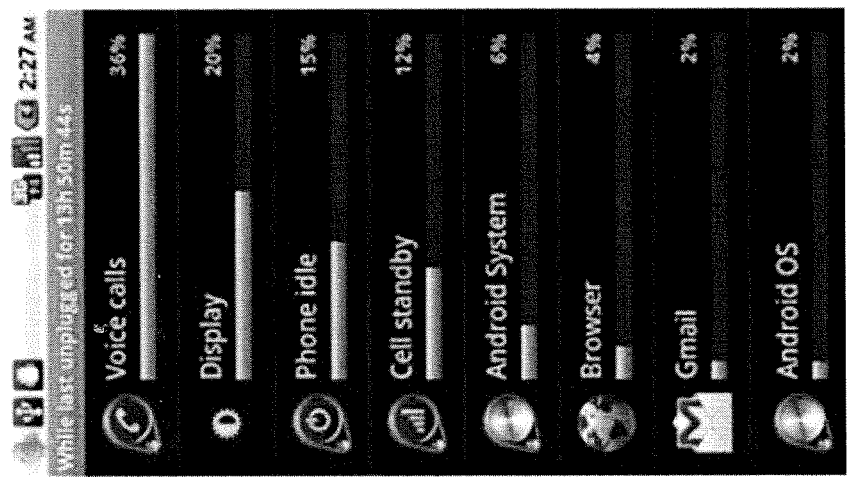
Figure 2B:
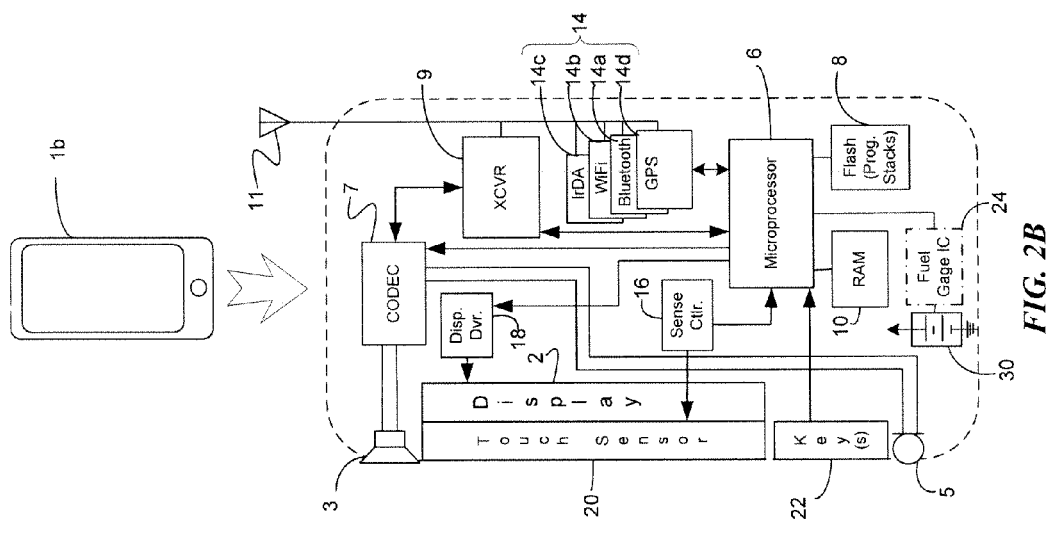
FIGS. 2A and 2B illustrate high-level functional block diagrams of mobile handsets.
Figure 2A:
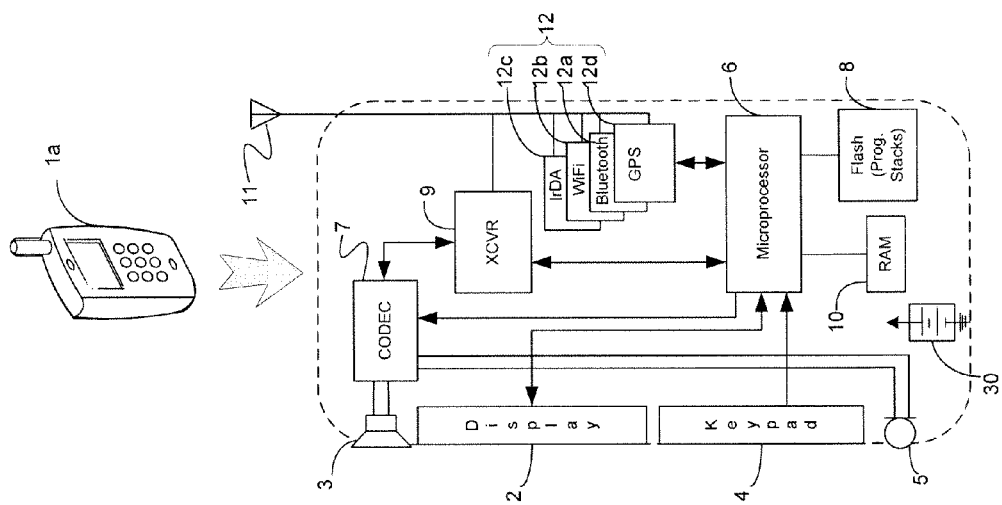

Reference now is made in detail to the examples illustrated in the accompanying drawings and discussed below. FIGS. 2A and 2B illustrate general block diagrams of mobile devices in the form of mobile handsets. In particular, FIG. 2A provides a block diagram illustration of an exemplary non-touch type mobile device 1a. FIG. 2B depicts a touchscreen type smart phone, as will be discussed later.

Although the mobile device 1a of FIG. 2A may be a smartphone or may be incorporated into another device, such as a personal digital assistant (PDA) or the like, for discussion purposes, the illustration shows the mobile device 1a is in the form of a handset. The handset embodiment of the mobile device 1a functions as a normal digital wireless telephone station. For that function, the mobile device 1a includes a microphone 5 for audio signal input and a speaker 3 for audio signal output. The microphone 5 and speaker 3 connect to voice coding and decoding circuitry (CODEC or "codec") 7. For a voice telephone call, for example, the codec 7 provides two-way conversion between analog audio signals representing speech or other audio and digital samples at a compressed bit rate compatible with the digital protocol of wireless communications network or voice over packet (Internet Protocol) communications.

For digital wireless communications, the mobile device 1a also includes at least one transceiver (XCVR) 9. Today, the mobile device 1a would be configured for digital wireless communications using one or more of the common mobile network technology types. The concepts discussed here encompass embodiments of the mobile device 1a utilizing any digital transceivers that conform to current or future developed digital wireless communication standards, such as Global Systems for Mobile Communications (GSM), Code Division Multiple Access (CDMA), Long-Term Evolution (LTE), and other variants. The mobile device 1a may also be capable of analog operation via a legacy network technology.

The transceiver 9 provides two-way wireless communication of information, such as digital speech samples and/or digital information, in accordance with the technology of a mobile network. Each transceiver 9 connects through Radio Frequency (RF) send and receive amplifiers (not separately shown) to an antenna 11.

The mobile device 1a includes a display 2 for displaying messages, menus or the like, call related information dialed by a user, calling party numbers, etc., including various battery management functions. A keypad 4 enables dialing digits for voice and/or data calls as well as generating selection inputs, for example, as may be keyed-in by the user based on a displayed menu or as a cursor control and selection of a highlighted item on a displayed screen. The display 2 and keypad 4 are the physical elements providing a textual or graphical user interface. Various combinations of the keypad 4, display 2, microphone 5 and speaker 3 may be used as the physical input/output elements of the graphical user interface, for multimedia based (e.g., audio and/or video) communications. Of course, other user interface elements may be used, such as a trackball, as in some types of PDAs or smart phones.

In addition to normal telephone and data communication related input/output functions (including message input and message display functions), the user interface elements also may be used for display of menus and other information to the user and user input of selections, including any needed during battery management of the mobile device 1a.

A microprocessor 6 serves as a programmable controller for the mobile device 1a, in that it controls all operations of the mobile device 1a in accord with programming that it executes, for all normal operations, and for operations involved in battery management functions under consideration here. In the example, the mobile device 1a includes a flash type program memory 8 for storage of various "software" or "firmware" program routines and mobile configuration settings. The mobile device 1a may also include a non-volatile random access memory (RAM) 10 for a working data processing memory. Of course, other storage devices or configurations may be added to or substituted for those in the example. In a present implementation, the flash type program memory 8 stores firmware such as a boot routine, device driver software, an operating system, call processing software and control software, and any of a wide variety of other applications, such as client browser software and mobile device battery management software. The memories 8 and 10 also store various data, such as telephone numbers and server addresses, downloaded data such as multimedia content, and various data input by the user. Programming stored in the flash type program memory 8, sometimes referred to as "firmware," is loaded into and executed by the microprocessor 6.

The mobile device 1a also includes a plurality of components (or modules) 12 for other forms of wireless communications. The exemplary components 12 support wireless communications technology, such as Bluetooth, WiFi, Infrared Data Association (IrDA), Global Positioning System (GPS), etc.

Bluetooth is a proprietary, open wireless technology standard for exchanging data over short distances from fixed and mobile devices. The component 12a is a low-cost transceiver microchip for Bluetooth wireless technology. Using a Bluetooth enabled mobile device (e.g., a mobile device including the component 12a with associated software, or the like), for example, a user can use a handsfree headset for telephone conversation. WiFi is a wireless networking technology which is based on the 802.11 standard developed by the Institute of Electrical and Electronics Engineers (IEEE). A WiFi enabled device (e.g., a mobile device including the component 12b and associated software, or the like) connects wirelessly to the Internet via a wireless router in a WiFi network, and thus providing a user with a wireless connection to the Internet. In a mobile device like 1a, the WiFi component 12b provides an alternate wireless communication capability, e.g., where WiFi Internet is available and may be free but public network cellular communication is expensive or unavailable. IrDA is a wireless technology that uses infrared signals, but it requires a direct line of sight between two IrDA devices for communications. An IrDA enabled device (e.g., a mobile device including the component 12c or the like) can provide the user with capability to transfer pictures between the device and other IrDA enabled devices, printers, and display devices. GPS is a global positioning technology which provides a user of the mobile device with a global navigation and positioning tool. A GPS enabled mobile device (e.g., a mobile device including the GPS component 12d and its associated application software) informs the user of exact positioning information of the mobile device and may support other services like maps and/or directions.

A battery 30 is the source of energy for the mobile device circuitry and subsystems. Mobile device batteries have different weights, lifetimes, talk time, and thicknesses. Lithium-Ion (Li-Ion) type batteries are commonly used in mobile devices because they are lighter and slimmer than other types (e.g., Nickel Cadmium (NiCD) and Nickel Metal Hydride (NiMH) type batteries) and provide good capacity for their size and weight. Generally, the battery 30 is charged through a proprietary charging algorithm and feeds power directly to many parts of the mobile device 1a including the display 2, keypad 4, etc.

As outlined above, the mobile device 1a includes a processor, and programming stored in the flash memory 8 configures the processor so that the mobile device is capable of performing various desired functions, including in this case the functions involved in the technique for providing improved battery management of the mobile device 1a.

Similarly, FIG. 2B provides a block diagram illustrating an exemplary touchscreen type mobile device 1b. Although configured somewhat differently, at least logically, a number of the elements of the exemplary touchscreen type mobile device 1b are similar to the elements of mobile device 1a, and are identified by like reference numerals of FIG. 2A. For example, the touchscreen type mobile device 1b includes a microphone 5, speaker 3 and codec 7, for audio input and output functions, much like in the earlier example.

The mobile device (or handset) 1b also includes at least one transceiver (XCVR) 9, for wireless communications, although the mobile device 1b may include an additional digital or analog transceiver. The concepts discussed here encompass embodiments of the mobile device 1b utilizing any digital transceivers that conform to current or future developed digital wireless communication standards, such as GSM, CDMA, LTE, and other variants. As in the mobile device 1a, the transceiver 9 provides two-way wireless communication of information, such as digital speech samples and/or digital information, in accordance with the technology of a mobile network. Each transceiver 9 connects through RF send and receive amplifiers (not separately shown) to an antenna 11. In addition, the mobile device 1b also includes a plurality of components (or modules) 14 for wireless communications. The exemplary components 14 support wireless communications technology, such as Bluetooth, WiFi, IrDA, GPS, etc. Hence, the exemplary device includes a Bluetooth component 14a, a WiFi component 14b, an IrDA component 14c, a GPS receiver 14d, and software for use for those components.

As in the example of the mobile device 1a, a microprocessor 6 serves as a programmable controller for the mobile device 1b, in that it controls all operations of the mobile device 1b in accord with programming that it executes, for all normal operations, and for operations involved in the battery management under consideration here. In the example, the mobile device 1b includes a flash type program memory 8, for storage of various program routines and mobile configuration settings. The mobile device 1b may also include a non-volatile random access memory (RAM) 10 for a working data processing memory. Other storage devices or configurations may also be added to or substituted for those in the example. Hence, as outlined above, the mobile device 1b includes a processor, and programming stored in the flash memory 8 configures the processor so that the mobile device 1b is capable of performing various desired functions, including in this case the functions involved in the technique for providing improved mobile device battery management.

In the example of FIG. 2A, the user interface elements included a display and a keypad. However, in the example of FIG. 2B, the mobile device 1b may have a limited number of key(s) 22, and thus the user interface functions of the display and keypad are replaced by a touchscreen display. At a high level, the touchscreen display is a device that displays information to a user and can detect occurrence and location of a touch on the area of the touchscreen. The touch may be an actual touch of the touchscreen with a finger, stylus or other object, although at least some touchscreens can also sense when the object is in close proximity to the touchscreen. Use of the touchscreen display as part of the user interface enables a user to interact directly with the information presented on the display.

Hence, the mobile device 1b includes a display 2, which the microprocessor 6 controls via a display driver 18, to present visible outputs to a user. The mobile device 1b also includes a touch/position sensor 20. The touch sensor 20 is relatively transparent, so that the user may view the information presented on the display 2. A sense circuit 16 senses signals from elements of the touch sensor 20 and detects occurrence and position of each touch of a screen formed by the display 2 and touch sensor 20. The sense circuit 16 provides touch position information to the microprocessor 6, which then can correlate that touch position information to the information currently displayed via the display 2, to determine the nature of a user input via the screen.

The display 2 and touch sensor 20 (and possibly one or more keys 22, if included) are the physical elements providing textual and graphical user interface for the mobile device 1b. The microphone 5 and speaker 3 may be used as additional user interface elements for audio input and output.

The mobile device 1b also includes a battery 30 which powers the mobile device circuitry and subsystems. As mentioned earlier, Li-Ion type batteries are commonly used in the mobile devices, because they are lighter and slimmer than other types (e.g., NiMH and NiCd type batteries) and provide good capacity for their size and weight. The battery 30 is charged through a proprietary charging algorithm and feeds power directly to many parts of the mobile device 1b including the display 2, keypad 4, etc.

Optionally, a battery "fuel gage" chip (or integrated circuit) 24 can be included in the mobile device 1b. Using the battery fuel gage chip 24 (e.g., TI Battery Fuel Gauge bq3060 or the like) the processor 6 of the mobile device 1b can measure available capacity, voltage, current and other parameters of the battery 30 in the mobile device 1b. As discussed later, such measurement information obtained from the battery fuel gage chip 24 can be used in estimating more accurate, real-time battery consumption rates of each application, service, and/or component on the mobile device 1b.

The structure and operation of the mobile device 1a and 1b, as outlined above, were described by way of example, only. For the illustration purposes, the description of the present teachings below is made in reference to a touchscreen type mobile device 1b or the like. It is however appreciated that one skilled in the art can easily modify and implement the disclosed subject matter in a non-touch screen type mobile device (e.g., a mobile device 1a) or in other mobile or portable communication and data processing type mobile devices, such as netbook, tablet, notebook computers or the like.

Figures 3, 4:
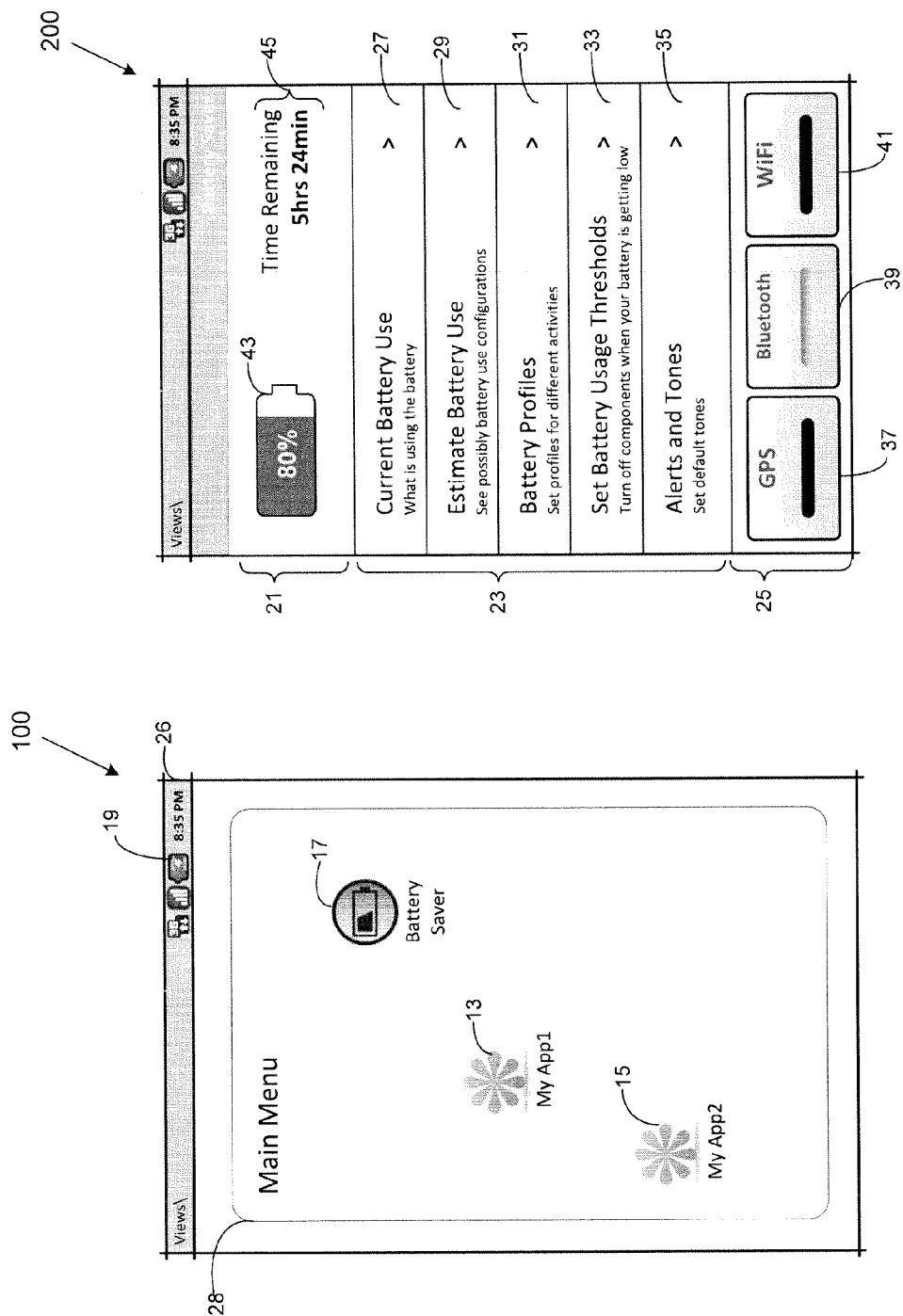
FIG. 3 illustrates a home screen of a touchscreen type mobile handset (or device) of FIG. 2B, which offers a dynamic battery saver.
FIG. 4 illustrates an implementation of an exemplary graphical user interface of the mobile device battery management program.

FIG. 3 illustrates a home screen 100 on a mobile device 1b. The home screen 100 is the main screen of the mobile device 1b, which is a starting point for most activities on the mobile device 1b, for example, providing access to the mobile web, text messaging, phone settings, etc. The home screen 100 includes a notification bar 26 and a main menu 28. The notification bar 26 includes one or more icons providing various information and/or quick access to one or more applications running on the mobile device 1b. The main menu 28 includes one or more icons for various programs (or applications) and/or services available to the user on the mobile device 1b. In the example, the user can access mobile device applications, such as My App1 13, My App2 15, or Battery Saver 17 by selecting a corresponding icon 13, 15, or 17 in the main menu 28. In a touchscreen device, the user only needs to tap the screen on a desired icon to select a particular application. Of note, the Battery Saver icon 17 is an icon for launching a dynamic mobile device battery management program (or the "Battery Saver" program) installed on the mobile device 1b.

The Battery Saver program is a battery power management application providing the user with increased ability to efficiently manage battery power consumption of the mobile device 1b, through the various battery management functions which are discussed later. The user can start the mobile device battery management program by selecting the Battery Saver icon 17 in the main menu 28 or the battery icon 19 in the notification bar 26. Alternately, the Battery Saver program can be invoked by a widget or shortcut. Selecting either the Battery Saver icon 17 or the battery icon 19 launches a graphical user interface (GUI) 200, an example of which is illustrated in FIG. 4.

The GUI 200 of FIG. 4 serves as an initial home screen for starting various battery management functions on the mobile device 1b offered by the Battery Saver application; the user need not go through the settings. In the example, the GUI 200 includes a plurality of display areas 21, 23, and 25. The upper display area 21 presents information relating to current battery status, health, and remaining battery time on the mobile device 1b, for example, via a battery icon 43 and a text body 45. Specifically, the battery icon 43 visually informs the user of the remaining battery life of the mobile device 1b in terms of percentage, and the text body 45 informs the user of the remaining battery time in terms of hours and minutes.

The middle display area 23 presents a plurality of access points for various available battery management functions, namely, Current Battery Use 27, Estimate Battery Use 29, Battery Profiles 31, Set Battery Usage Thresholds 33, and Alerts and Tones 35, in the example. Each access point includes a short text description for each battery management function. Icons may be displayed instead of or in addition to the texts. Upon selection of a particular one of the battery management functions by the user, a graphical user interface for the respective battery management function is presented to the user. In the example, the Current Battery Use 27 is a quick access point for presenting current information relating to current battery consumption by applications, services, or components running on the mobile device lb. The Estimate Battery Use 29 is a quick access point for exploring (or trying out) different configuration settings of the mobile device 1b and obtaining estimates of projected remaining battery time. The Battery Profiles 31 is a quick access point for selecting a pre-configured operational profile for battery power management for different activities. The Set Battery Usage Thresholds 33 is a quick access point for selecting a trigger, setting a condition for the trigger, and turning off one or more applications, services, or components based on the selected trigger condition. Alerts and Tones 35 is a quick access point for setting different tones and alerts for informing the user of a low battery level on the mobile device 1b.

The display area 25 includes a plurality of status buttons 37, 39, and 41 for components, visually displaying current status (e.g., turned on or off) of the components for wireless communications on the mobile device 1b. In one implementation, the display area 25 is reserved for the components causing the majority of the battery drain and that can be effectively turned off to reduce the drain. In other implementations, all of the components causing the battery drain may be displayed in the display area 25. As mentioned earlier, the components (or modules) for wireless communications support various wireless technologies including GPS, Bluetooth, WiFi, IrDA, etc. In the illustrated example of FIG. 4, the status buttons 37, 39, and 41 visually show that the GPS and WiFi components are turned on (e.g., by the full bar within the button and beneath the wording), but the Bluetooth component is turned off (e.g., by the empty bar within the button and beneath the wording). Additional status buttons, such as an IrDA status button, may be displayed by touch responsive scrolling in a lateral direction or a longitudinal direction.

Having discussed the home screen 200 for accessing various battery management functions, some implementation aspects of the battery management functions are described in detail below. As mentioned earlier, using the Estimate Battery Use 29 feature, the user can try out different configuration settings of the mobile device 1b and obtain estimates of projected remaining battery time. That is, the user can select the Estimate Battery Use 29 in FIG. 4 and start a battery management function (hereinafter, a "dynamic battery use estimator") for virtually estimating remaining battery time on the mobile device 1b, based on various user inputs of different configuration settings of the mobile device 1b. A configuration setting is defined as a set of applications, services, and/or components that are able to be selected to be run on a mobile device. An operational configuration setting is a configuration setting that is currently applied to and/or running on the mobile device. When the user selects the Estimate Battery Use 29, the dynamic battery use estimator presents a graphical user interface (GUI) 300 to the user, such as that shown by way of example in FIG. 5A.

Figures 5A, 5B:
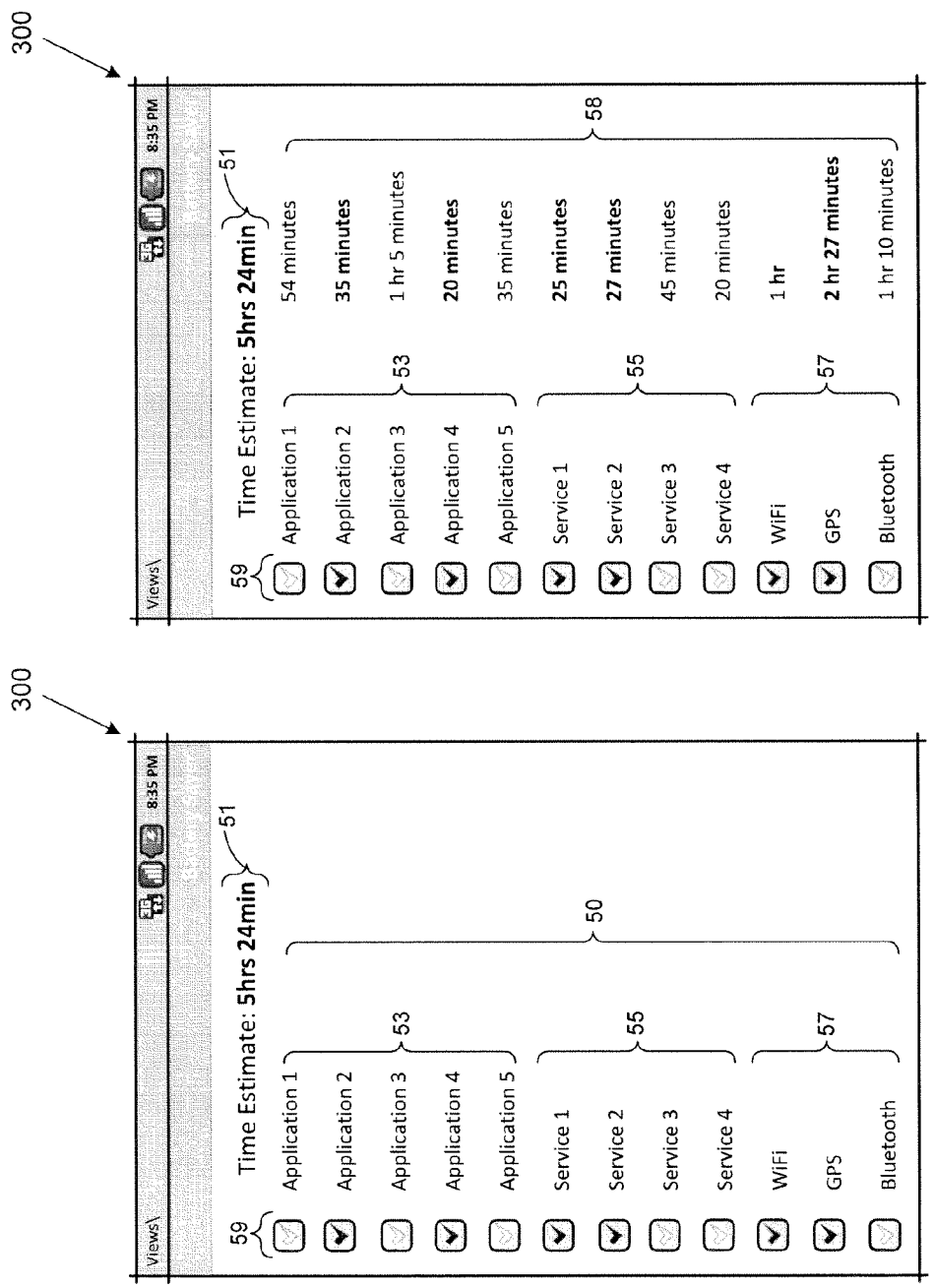
FIGS. 5A-5E illustrate an exemplary implementation of a dynamic battery use estimator and associated graphical user interfaces.

As shown, the GUI 300 presents to the user various pieces of information, including information relating to an estimate of projected remaining battery time in hours and minutes in a text area 51 and status information of various applications, services and components in a status area 50. The status area 50 includes a list of various items (e.g., a plurality of applications 53, a plurality of services 55, and a plurality of components 57) and associated checkbox 59 for each item. Applications includes, for example, games or utilities; services include, for example, e-mails, news, stock, weather; components include GPS, Bluetooth, WiFi, etc. It is noted that some applications have aspects of services, e.g., provide services on the mobile device, and vice versa. Although, in the example, for the purpose of discussion, classification of items (e.g., applications, services, and components) is used, any battery draining item can be listed or presented to the user without such classification. Checkbox status (checked or not) of each item indicates whether or not an application, service, or component is selected for estimation purposes. When first entering for the estimation, items that are running on the mobile device 1b are checked as being selected for estimating battery power consumption in a configuration setting. However, the GUI 300 allows the user to touch the checkbox for each item to select or deselect for establishing a new configuration setting on which the user wants to obtain an estimate of the projected remaining battery time. Additionally, the GUI 300 may display the estimated usage of each application, service or component in the area 58 as shown in FIG. 5B. This estimated usage information enables the user to determine what applications, services, and components have the most impact, and thereby enables the user to select which feature(s) to turn off when the mobile device battery is running low.

In the example, the GUI 300 shows that two applications—Application 2 and Application 4—are selected on the mobile device 1b, two services—Service 1 and Service 2—are currently selected to be available to the user on the mobile device 1b, and two components (or wireless communications modules)—WiFi and GPS—are currently selected for respective wireless communications and application services. Based on the current configuration setting as shown in FIG. 5A, the estimate of the projected remaining battery time is made and shown in the text area 51 (e.g., 5 hours and 24 minutes). In the example, this is the estimate for the current configuration of items actually running on the mobile device 1b and corresponds to the estimate shown at 45 in the home Battery Saver screen 200 of FIG. 4. In another implementation, each group of applications, services, or components can be turned off or unselected by a single user input or touch via, for example, a selectable button, such as "all services off," "all applications off," or "all components off." Also, the list of applications, services, and components can be displayed in various different manners, for example, by type as shown, alphabetically, most least memory use, most least often used, etc.

Now, it is assumed that the user wants to try out a different configuration setting to find out how changes to the configuration setting affect the estimate of the projected remaining battery time as shown in the text area 51. In a new try-out configuration setting, the user unselects an application (e.g., Application 2) and a component (e.g., GPS) by unchecking their associated checkboxes. Exemplary results are illustrated in FIG. 5C.

Figures 5C, 5D:
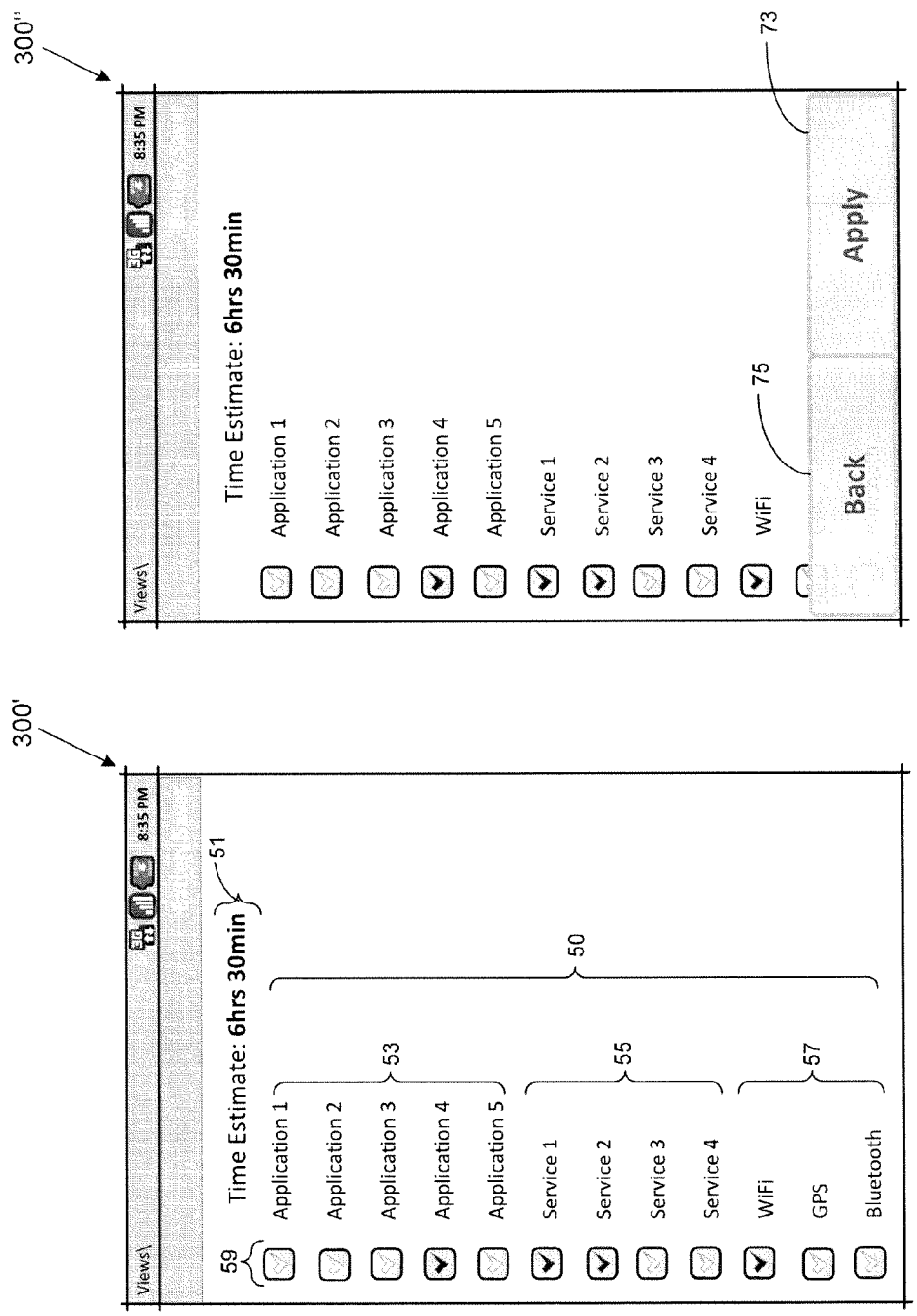

FIG. 5C shows the hypothetical results of the try-out configuration setting inputted by the user. For example, the status area 50 displays that the application—Application 2 and the component—GPS are unselected in their respective checkboxes, and as a result the estimate of the projected remaining battery time is updated in the text area 51 (e.g., 6 hours and 30 minutes).

When the user inputs the try-out configuration setting by selecting or unselecting any of applications, services, or components of the mobile device 1b via the GUI 300, the dynamic battery use estimator receives the inputs of the try-out configuration setting, and, based on the try-out configuration setting, calculates an estimate of the projected remaining battery time. This estimate is a hypothetical, virtual estimate because the try-out configuration setting is not yet applied to the mobile device 1b as an operational configuration setting (i.e., a configuration setting that is to be applied to and/or is running on the mobile device). Further, in estimating the projected remaining battery time, the dynamic battery use estimator uses standard battery consumption rates for each selected application, service, and/or component, which is not real-time. That is, the dynamic battery use estimator uses known, non-real time battery consumption rates for applications, services, and components selected by the user. Typically, the non-real time battery consumption rates are standard estimated values and may differ from the actual measured values in real-time.

Alternately, the dynamic battery use estimator can use real-time battery consumption rates for improved accuracy in estimations for selected applications, services, and/or components in the calculation. As mentioned earlier, for such improved accuracy in the estimations, a monitoring chip (or integrated circuit, sometimes referred to as a "fuel gauge" chip) that monitors real-time power consumption of each application, service, or component can be utilized.

Further, the user can try out various configuration settings to see how each combination of application, service, and component on the mobile device 1b can affect the estimate of the projected remaining battery time before setting it as a desired operational configuration setting for the mobile device 1b.

As shown in FIG. 5D, when the user settles on a desired configuration setting that results in the estimate of the desired, projected remaining battery time, the user can apply the configuration setting as an operational configuration setting for the mobile device 1b. That is, after several user inputs, the user can set a try-out configuration setting as a new operational configuration setting for the mobile device. The user can press a pre-configured key (such as a menu key or the like) to display an Apply button 73 and a Back button 75, as illustrated in FIG. 5D. The Apply button 73 allows the user to set the mobile device 1b to operate in the new operational configuration setting. However, if the user does not want to apply the new configuration setting, the user can touch or select the Back button 75, which allows the user to go back to previous screens and try out different configuration settings. In addition, the user can save the desired configuration setting as an operational profile that is to be selected, which is illustrated later.

Figure 5E:
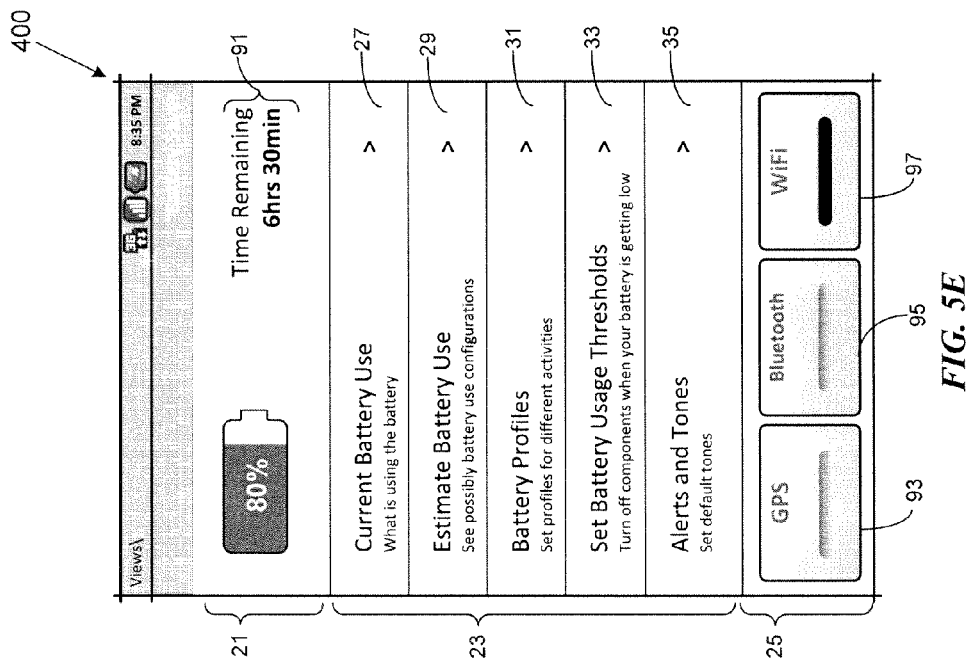

Once the try-out configuration setting is applied as an operational configuration setting for the mobile device 1b, by selecting the Apply button 73 in the GUI 300, an updated home screen 400 is presented to the user, as in FIG. 5E. The updated home screen 400 of FIG. 5E displays updated information including a new estimate of the projected remaining battery time and updated status of the components after the new operational configuration setting has taken effect for the mobile device 1b. Specifically, as shown in FIG. 5E, the new estimate of the projected remaining battery time is shown as being updated to 6 hours and 30 minutes (e.g., in the new configuration setting) from 5 hours and 20 minutes (e.g., in the previous configuration setting) in a text area 91. Also, the bottom display area 25 indicates that the GPS and Bluetooth components 93 and 95 are turned off and the WiFi component 97 remains turned on.

Figures 6A, 6B:
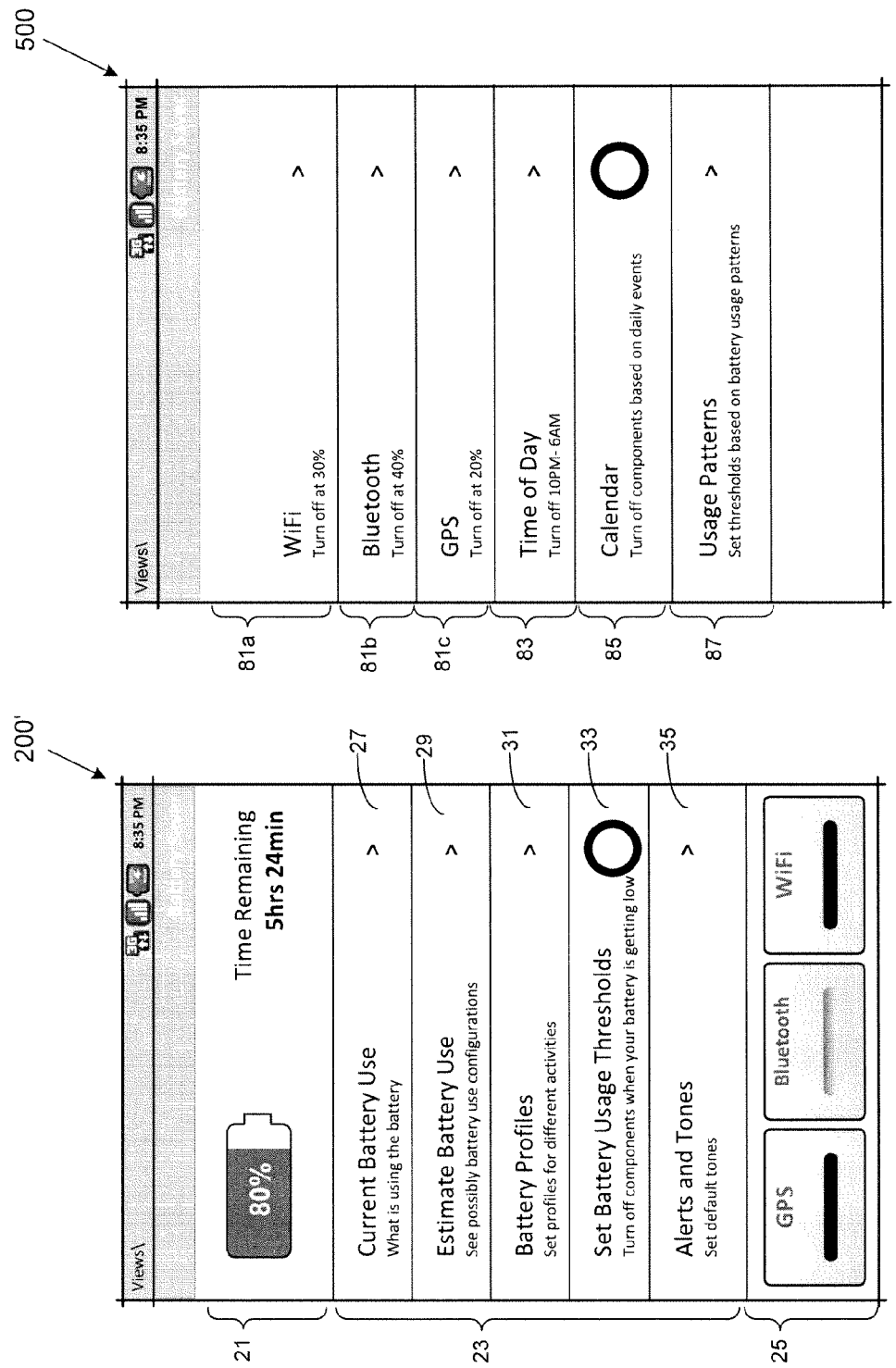

As discussed earlier, another function of the exemplary Battery Saver application allows a user of a mobile device to set certain conditions for individual triggers for alerting and/or turning off applications, services, and components that may be running on the mobile device, in order to manage or reduce battery power consumption. The Battery Saver GUI provides the user with this capability via the Set Battery Usage Thresholds access point 33 as illustrated in FIGS. 4 and 6A. That is, the user can select the Set Battery Usage Thresholds 33 and execute another battery management function (hereinafter, a "battery threshold manager") that allows the user to select a trigger, set a condition for the selected trigger, and select at least one application, service, and/or component for alerting and/or turning off the selected application, service, and/or component when the condition occurs. For example, the user may select remaining battery power as a trigger, set a threshold (such as 40%) for the remaining battery power as the trigger condition, and turn off an application, service, or component when the threshold is reached.

FIGS. 6A-6F illustrate possible GUI displays and thus a possible process flow of an exemplary implementation of the battery threshold manager. As shown, the user can select the Set Battery Usage Threshold 33 in FIG. 6A to start the battery threshold manager. The battery threshold manager presents a graphical user interface (GUI) 500 in FIG. 6B showing a plurality of triggers that can be selected by the user. The triggers illustrated in the example relate to components, such as WiFi 81a, Bluetooth 81b, and GPS 81c. Also shown are triggers relating to time of day (e.g., Time of Day 83), calendar events (e.g., Calendar 85), and battery usage patterns (e.g., Usage Patterns 87). In addition, the user can define other triggers, such as those based on information relating to certain days of the week, time of the day, or a combination of the two; based on information relating to a certain pre-specified location; based on information relating to current battery strength; based on information relating to current signal strength, e.g., GPS, cellular, WiFi, etc.; based on information relating to the user's (or the user's friends') presence information; and based on information relating to other phone events in progress, e.g., sending email, surfing web, a call connected, etc. That is, the battery threshold manager provides the user with capabilities to define any trigger that can be used in conjunction with the operations of a mobile device. In addition, a trigger can be defined based on proximity information of the user to some latitude and longitude values and/or street address. Such proximity information of the user is determined via GPS and/or cell sector ID of the user's mobile device.

For the purpose of illustration in FIGS. 6B-6F, it is assumed that via the battery threshold manager the user desires to better manage battery power consumption of the user's mobile device by turning off some applications and components while the user is in a working meeting with others on a given date on the user's calendar. A sequence of illustrative steps for using the battery threshold manager is described below in reference to FIGS. 6A-6F.

Figures 6C, 6D:
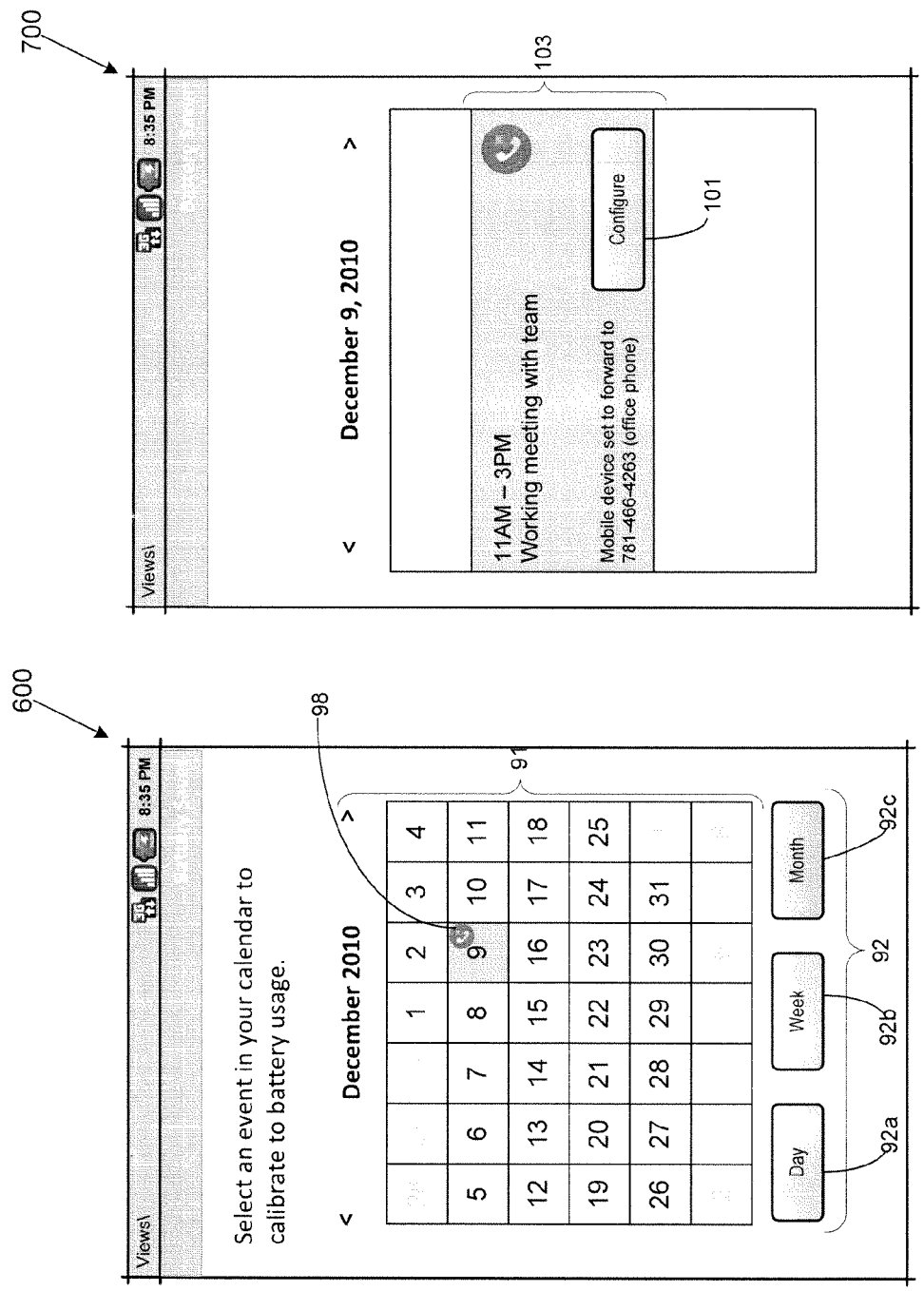

In FIG. 6A, the user selects the Set Battery Usage Thresholds 33, which presents to the user the graphical user interface (GUI) 500 as shown in FIG. 6B. As discussed earlier, via the GUI 500, the battery threshold manager provides the user with a plurality of triggers available for selection. When the user selects the Calendar 85, the battery threshold manager presents the user's calendar stored in the mobile device 1b via another graphical user interface (GUI) 600, as illustrated in FIG. 6C. The GUI 600 displays, among other information, the user's calendar 91, an event information (as indicated by an event icon 98), and a plurality of buttons 92 for different calendar views (e.g., a Day button 92a for displaying a daily calendar view, a Week button 92b for displaying a weekly calendar view, and a Month button 92c for displaying a monthly calendar view). As shown, in the example a monthly calendar view is presented to the user with an event scheduled on the 9th of the month (e.g., Dec. 9, 2010). The scheduled event is indicated by the event icon 98 and/or highlighting of the date.

When the user selects the event icon 98 in the calendar 91, the battery threshold manager presents to the user a graphical user interface (GUI) 700, which shows detailed information of the event scheduled in an event text area 103 and a Configure button 101. The Configure button 101 allows the user to modify or reconfigure an operational configuration setting of the mobile device 1b. In the illustrated example, the event information in the event text area 103 shows that from 11 a.m. to 3 p.m. on Dec. 9, 2010, the user has a working meeting with other colleagues in her office and all incoming calls and messages are set to be forwarded to the user's office phone number. When the user selects the Configure button 101, the battery threshold manager presents to the user associated graphical user interfaces similar to the GUIs as shown in FIGS. 5A-5E for changing an operational configuration setting according to the user's needs. Based on the calendar information, the user is able to select and/or deselect any application, service, or component that is not needed during the working meeting. For example, the user can deselect (for turn off at the appropriate time) certain components of the mobile device 1b, such as GPS, Bluetooth, and WiFi components so that during the working meeting the selected components of the mobile device 1b remain turned off and do not consume any battery power.

After setting a desired, operational configuration setting of the mobile device for use during the working meeting, the user can press a pre-configured key to bring out another graphical user interface (GUI) 800, such as that shown in FIG. 6E, which provides the user with various information, including information 121 of the components (e.g., WiFi, GPS, and Bluetooth) and information 123 of incoming calls and messages during the working meeting. As shown, FIG. 6E illustrates, in addition to the battery saving configuration setting (e.g., mobile device status), other feature configuration information relating to call and message forwarding features of the mobile device. Although the battery saving configuration setting and other feature configuration information are shown together in the example, they are independent and can be independently changed. When the user is satisfied with the configuration setting for the mobile device 1b and the information presented to the user via the GUI 800, the user can save the configuration setting as an operational configuration setting during the working meeting by pressing a pre-configured key (e.g., a menu key) or the like. As shown in FIG. 6F, pressing the pre-configured key (e.g., a menu key) or the like displays two control buttons—a Cancel button 125 and a Save button 127 at the bottom of the GUI 800'. Selection of the Save button 127 allows the user to save the configuration setting defined above by the user as an operational configuration setting, based on the event scheduled on the user's calendar. Operation (touching) of the Cancel button 125 allows the user to cancel the configuration setting defined above by the user and go back to previous screens for another trial.

In the example, if the configuration setting is saved as the operational configuration setting during the working meeting, the battery threshold manager starts monitoring operation of the mobile device 1b in relation to the trigger condition set (e.g., date and time in relation to a calendar event). The battery threshold manager continues to monitor the operation of the mobile device 1b, and, at 11 a.m. on Dec. 9, 2010 (e.g., at the start of the scheduled working meeting for the user), the battery threshold manager determines that the condition for the trigger is met, and as a result the battery threshold manager alerts (or notifies) the user and/or turns off the selected GPS, Bluetooth, and WiFi components of the mobile device 1b, as previously defined and saved in the operational configuration setting by the user. Further, when the selected component of the mobile device 1b is turned off (e.g., WiFi is turned off), at least one associated secondary application or service can be automatically turned off. That is, when at least one selected application, service, or component of the mobile device (e.g., applications or services that were previously selected by the user) is turned off, the battery threshold manager may turn off automatically at least one associated secondary application, service, or component of the mobile device (e.g., all other applications and services that are currently using WiFi are also turned off).

As discussed earlier, in addition to calendar events, other triggers can be used. Some examples of the triggers are battery consumption levels, battery usage patterns, Radio Frequency (RF) signal strength, or connections to a network. Specifically, if a battery consumption level is used as a trigger for the mobile device 1b, the user can set a certain battery level as a condition (e.g., 40% of battery life) before turning off certain applications and components (e.g., News updates, GPS, etc.). In such a case, when the battery level reaches 40%, the mobile device 1b alerts (or notifies) the user and/or turns off the selected application and components—News update, GPS, etc. Another example is a battery usage pattern based on information collected about how the user uses the mobile device. For example, a trigger can be created based on any information that can be collected on the mobile device, such as a click stream on the mobile device (i.e., order of the user clicks on the mobile device), concurrent applications running on the mobile device, time of day, day of week, or even hours since the mobile device's power-on, etc. The list of possible triggers based on basic information about the mobile device usage is endless. For example, for a battery usage pattern based on the concurrent applications being open on the mobile device, a trigger can be pre-defined to invoke when two or more applications are concurrently open for use. For illustration, it is presumed that the user often uses Bluetooth to connect the mobile device to a portable printer after the user launches Calendar® and then Documents to Go® applications on the mobile device. In this example, the user can set a trigger and its condition so that the mobile device turns on Bluetooth when Calendar® and Documents to Go® applications are concurrently open on the mobile device. As a result, when the user launches both applications on the mobile device, Bluetooth automatically turns on for communication with the portable printer. Another example can be a trigger based on the current location of the mobile device. In this case, when the mobile device is in the specified location (e.g., at home, work, school, etc.), the user is alerted and/or the user selected applications, services, and components are turned off.

Similarly, RF signal can be set as a trigger and a predetermined signal strength as its condition. For example, when WiFi signal strength decreases to below a predetermined FR signal strength, the user is alerted and/or the WiFi component and all associated WiFi applications and services are turned off. Alternately, it may be desirable to turn off the public cellular network transceiver while the mobile device 1b is communicating via the WiFi component 14a. Further, there are many other candidates for the triggers that can be used in the battery threshold manager. It is appreciated that one of ordinary skill in the art can conceive and use other triggers in implementing the battery threshold manager for improved management of battery power consumption of the mobile device 1b.

In case of a conflict in configuration settings, the user may be alerted with the conflicting configuration settings and provided with an option to set a particular configuration setting as an operational configuration setting for the mobile device over the other configuration setting. That is, when two or more configuration settings are set and different circumstances exist, for example, a configuration setting based on a meeting event in the user's office, and a configuration setting based on the user's location (e.g., the user's office), the user may be alerted with a conflict and provided with an option, via a graphical user interface, to select one particular configuration setting over the other configuration settings as an operational configuration setting of the mobile device during the meeting in the user's office. Alternatively, an override configuration setting may be established by the user in the event of a conflict such that one configuration automatically overrides the other without user intervention. Extending the above example, the user may establish the override configuration setting such that a configuration setting associated with the meeting event overrides a configuration setting based on the mobile device's location. Alternatively, the override configuration setting may be set such that a more recent configuration setting overrides older configuration settings.

Figures 7A, 7B:
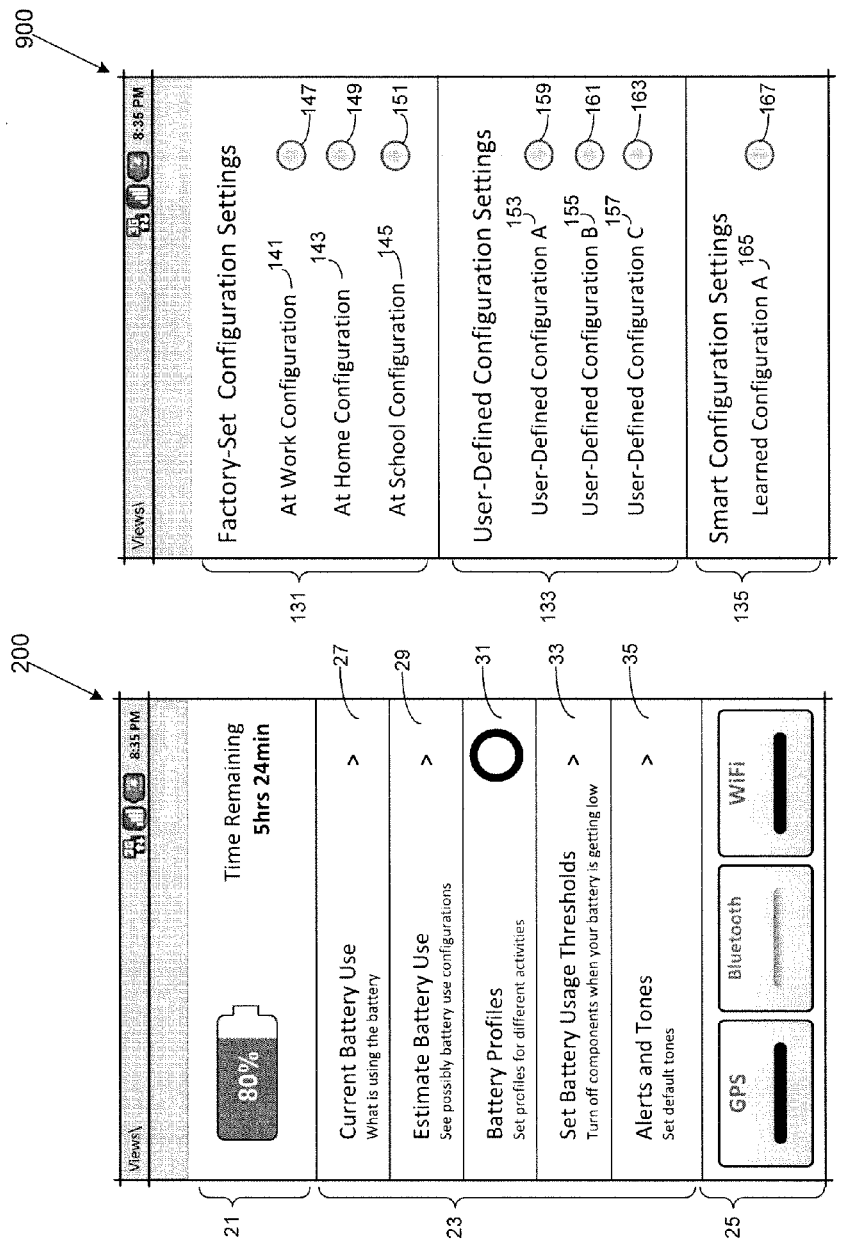
FIGS. 7A and 7B illustrate an exemplary implementation of a profile based battery manager and associated graphical user interfaces.

In the present example, the user of a mobile device can also manage battery power consumption of the mobile device with minimal user interaction through another battery management function, via a "profile based battery manager" function. As illustrated in FIG. 7A, the user can select the Battery Profiles access point 31 in the GUI 200 to start the profile based battery manager. Upon the selection, the profile based battery manager presents, via a graphical user interface (GUI) 900, a plurality of profiles for different operational configuration settings (see FIG. 7B). As shown, the profiles in our example include a plurality of pre-configured operational profiles 131 (e.g., Factory Configuration Settings), a plurality of user-defined operational profiles 133 (e.g., User-Defined Configuration Settings), and a smart operational profile 135 (e.g., Smart Configuration Settings). In the example, the user can select an operational profile among one or more operational profiles of usage of the mobile device 1b. Each operational profile corresponds to a different operational configuration setting impacting power consumption from the battery of the mobile device 1b. Thus, the user only needs to select a single profile to set an operational configuration setting of the mobile device 1b; this simplifies the user's interaction with the dynamic battery use estimator and the battery threshold manager, as described earlier.

In the illustrated example of FIG. 7B, the pre-configured operational profiles 131 (e.g., the Factory Configuration Settings) include common and popular operational configuration settings that are pre-set or pre-configured at factory as "out-of-box" settings (e.g., an At Work Configuration 141, an At Home Configuration 143, and an At School Configuration 145). The user can select one of the pre-configured operational profiles 131 by selecting a corresponding radial selection button 147, 149, or 151.

The user-defined operational profiles 133 (e.g., the User-Defined Configuration Settings) include operational configuration settings that the user saved earlier during the use of the dynamic battery use estimator or the battery threshold manager. Similarly, the user can select one of the user-defined configuration settings by selecting a corresponding radial section button 159, 161, or 163. Further, the user can modify any of the user-defined configuration settings, in a manner similar to techniques shown in FIGS. 5A-5D. The smart operational profile 135 (e.g., Smart Configuration Settings) is an operational configuration setting that the mobile device has "learned" over time by itself without any user interaction. For example, when the Learned Configuration A 165 is selected, the mobile device 1b is put in an autonomous learning mode and thereafter the profile based battery manager builds an operational profile for the user of the mobile device 1b by observing and collecting information as to what applications, services and components of the mobile device 1b the user tends to use at certain times, certain locations, etc. Once the information is collected, the profile based battery manager builds a learned operational configuration setting (i.e., an operational configuration setting learned by the mobile device over time) for the mobile device 1b, and the mobile device 1b automatically switches and adjusts its operational profile. As a result, the mobile device 1b continually adjusts its operational configuration setting for optimal battery consumption without user interaction.

Figures 8A, 8B:
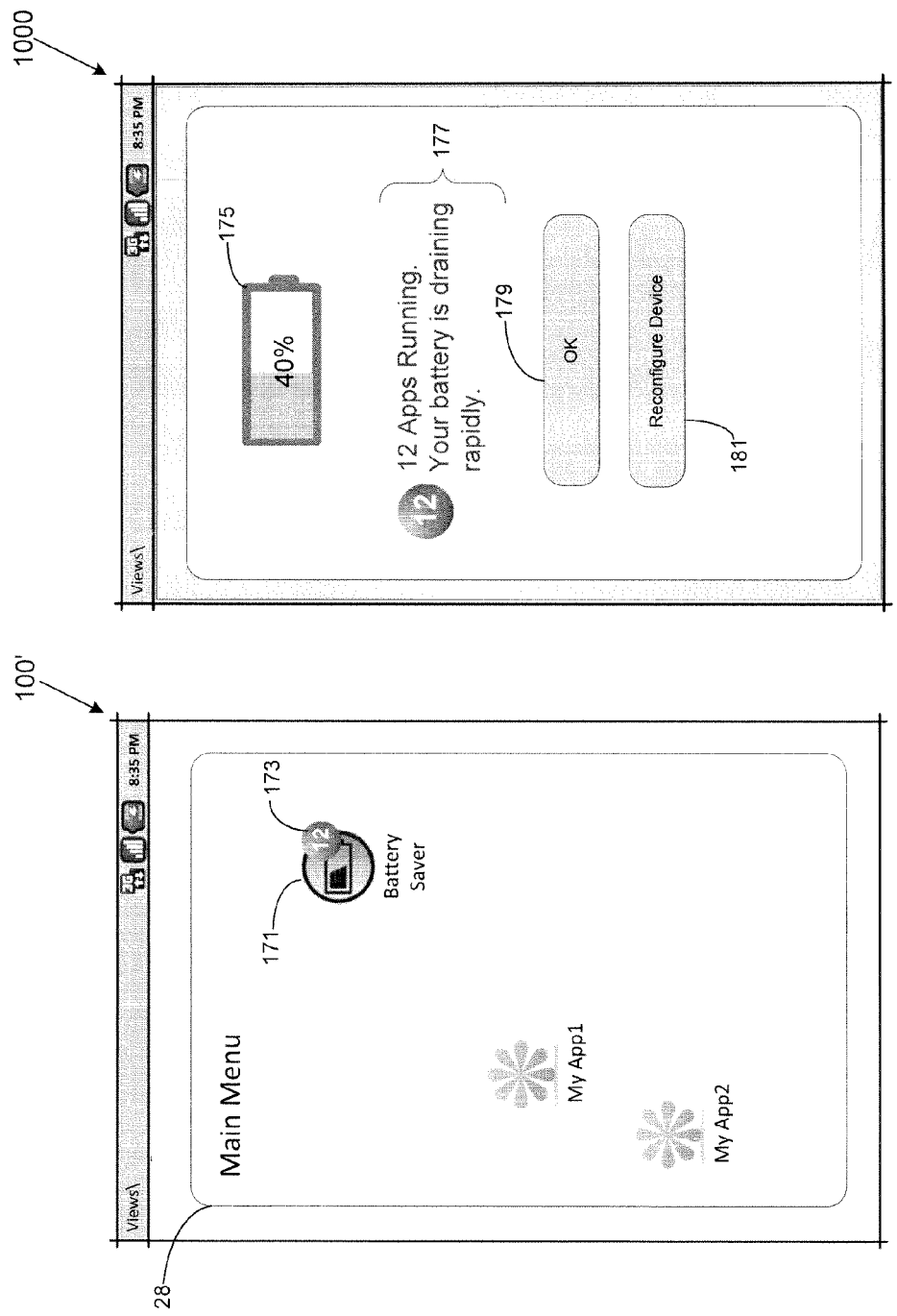
FIGS. 8A and 8B illustrate another exemplary implementation of battery management functions in accordance with the present teachings.

FIGS. 8A and 8B illustrate another aspect of the implementation of the exemplary mobile device battery management program. In FIG. 8A, the home screen 100' of the mobile device 1b shows that in the main menu 28 the Battery Saver icon 171 includes an alert 173. The alert may be visually represented in many ways including a modifier to the Battery Saver icon 171 or as an alert in the notification bar of the mobile device 1b. The alert 173 informs the user of the number of applications, services, or components running on the mobile device when the battery level becomes below a pre-defined level. When the user selects the alert 173 in the GUI 100', the mobile device battery management program presents various information via a graphical user interface (GUI) 1000, as shown in FIG. 8B. In the example, the GUI 1000 displays a battery status graph 175, an alert message 177, an OK button 179, and a Reconfigure Device button 181. The battery status graph 175 visually shows status information (e.g., percent left, health, charging, etc) of the battery of a mobile device 1b in real time. In the example, the battery status graph 175 informs the user that about 40% of the battery power is currently remaining for use without recharge. The text message in the alert message 177 informs the user of how many applications, services, or components are currently consuming the battery of the mobile device 1b in a current configuration setting. The OK button 179 allows the user to accept the current configuration setting of the mobile device 1b. The Reconfigure Device button 181 allows the user to reconfigure the current configuration setting of the mobile device 1b. Upon selecting the Reconfigure Device button 181, the user can change operational configuration settings of the mobile device 1b, in a manner similar to one or more of the techniques described above.

The mobile device battery power management application can be implemented by using various programming languages, such as Java, C, C++, and other software languages. For example, the mobile device battery management application can be written to execute on a binary runtime environment for Brew-based mobile devices, Windows Mobile based mobile devices, Android based mobile devices, iPhones, Java Mobile based devices, or RIM based mobile devices, or the like. Some of these types of mobile devices can employ a multitasking operating system as well. Further, the mobile device battery management program can reside natively on the mobile device's operating system or be an application that is installed on top of the operating system, leveraging various Application Programming Interfaces (APIs). Also, as mentioned earlier, the mobile device battery management program can utilize a battery monitoring chip for improved accuracy in estimations, if desired.

Figure 9:
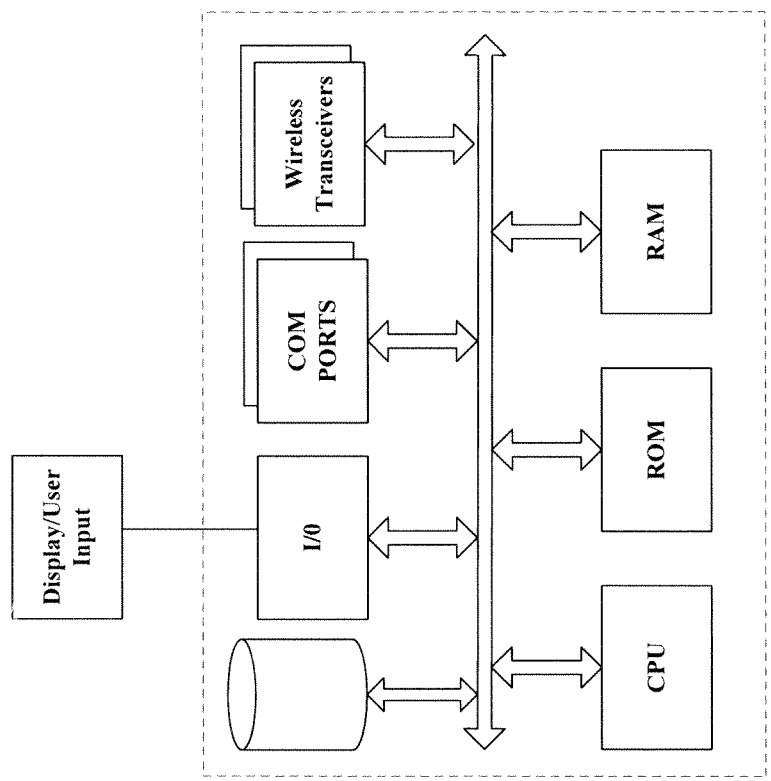
FIG. 9 is a simplified, functional block diagram of a mobile device (or computer).

As discussed earlier, functions relating to battery management of mobile devices can be implemented on mobile devices, including mobile handsets 1a and 1b or other mobile or portable communication and data processing type mobile devices (or mobile computers), such as netbook, tablet, notebook computers or the like. FIG. 9 provides a functional block diagram illustrating such a mobile computer with user interface elements, as may be used to implement a tablet, netbook, notebook computer or the like. It is believed that those skilled in the art are familiar with the structure, programming, and general operation of such computing equipment and as a result the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. The software functionalities involve programming, including executable code, associated stored data, and graphical user interface code for implementing the mobile device battery management program. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the methodology for battery management, in essentially the manner performed in the implementation discussed and illustrated herein.

Further, the battery management functions can be implemented in a remote computer (or server) on a network. That is, a mobile device sends information relating to a particular configuration setting of the mobile device to the remote server for estimating the battery consumption of the mobile device; and the remote server computes the estimation and returns the estimated results to the mobile device over the network for displaying the results on the mobile device. In the example above, the mobile device operates as a client terminal and the remote computer as a server in a client-server network environment. It is appreciated that one of ordinary skill in the art can easily implement the above mentioned battery management functions in such a client-server implementation.

Hence, aspects of the battery management functions outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the mobile computer, processors or the like, or associated modules thereof, such as various semiconductor memories, tape drives, disk drives and the like, which may provide non-transitory storage at any time for the software programming. All or portions of the software may at times be communicated through the Internet or various other networks. Such communications, for example, may enable loading of the software from one computer or processor into another, for example, from a remote server computer of a network into a mobile device or the like as illustrated herein. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the battery management functions, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves, such as those generated during radio frequency (RF) and infrared (IR) data communications. Common forms of computer-readable media therefore include, for example, a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprise the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An article of manufacture comprising a non-transitory machine readable medium, and a mobile device battery management program embodied in the medium, wherein execution of the mobile device battery management program by a processor of a mobile device configures the mobile device to implement battery management functions, the battery management functions including functions to:

provide a graphical user interface for battery management via a display and a user input element of the mobile device; and via the graphical user interface and while an operational configuration setting is currently applied to the mobile device:

receive inputs identifying different configuration settings of the mobile device from a user; and responsive to the user inputs, provide a dynamic battery use estimator by calculating and displaying to the user outputs of estimates of projected remaining battery life for the different configuration settings of the mobile device received as the user inputs, wherein:

the estimates are made for the different configuration settings that are not currently applied to the mobile device; and the different configuration settings are different from the operational configuration setting that is currently applied to the mobile device.

2. The article of manufacture of claim 1, wherein the input of each of the different configuration settings includes selection of at least one of an application, a service or a component on the mobile device.

3. The article of manufacture of claim 1, wherein the battery management functions further include functions to:

receive a user selection of one of the different configuration settings; and responsive to the user selection, change the operational configuration setting of the mobile device in accordance with the user selection.

4. The article of manufacture of claim 1, wherein the battery management functions further include a function to override an existing configuration setting in case of conflict between a new configuration setting and the existing configuration setting.

5. The article of manufacture of claim 3, wherein the user selection of one of the different configuration settings is saved as a user-defined operational profile of the mobile device, wherein the user-defined operational profile of the mobile device corresponds to a configuration setting of the mobile device that is to be selected for operation.

6. The article of manufacture of claim 1, wherein the dynamic battery use estimator calculates the estimates of projected remaining battery life based on either non-real time or real time battery consumption information.

7. The article of manufacture of claim 1, wherein the battery management functions further include functions to:

provide a battery threshold manager for allowing the user to:

(a) select a trigger from among a plurality of triggers;

(b) select a condition for the selected trigger; and (c) select at least one application, service, or component of the mobile device impacting power consumption from a battery of the mobile device;

monitor operation of the mobile device in relation to the selected trigger;

determine whether or not the condition has been met; and as a result of determining that the condition has been met:

notify the user that the condition has been met; and turn off the selected at least one application, service, or component of the mobile device.

8. The article of manufacture of claim 7, wherein the triggers are based on information including calendar settings, battery consumption levels of the mobile device, battery usage patterns of the mobile device, Radio Frequency (RF) signal strength for wireless communication by the mobile device, status of a connection of the mobile device to a network, and proximity information of the mobile device.

9. The article of manufacture of claim 7, wherein some applications, services, and components are turned off based on different conditions of different triggers.

10. The article of manufacture of claim 7, wherein when the selected at least one application, service, or component of the mobile device is turned off, an associated secondary application, service, or component of the mobile device is also automatically turned off.

11. The article of manufacture of claim 7, wherein the battery management functions further include functions to:

provide a profile based battery manager for allowing the user to select one of a plurality of operational profiles of usage of the mobile device, each operational profile corresponding to a different configuration setting of the mobile device, wherein the plurality of operational profiles includes a user-defined operational profile corresponding to a configuration setting saved by the user; and set the mobile device to operate in an operational configuration setting corresponding to the selected operational profile.

12. The article of manufacture of claim 1, wherein the input of each of the different configuration settings includes selection of at least one of a service or a component on the mobile device.

13. An article of manufacture comprising a non-transitory machine readable medium, and a mobile device battery management program embodied in the medium, wherein execution of the mobile device battery management program by a processor of a mobile device configures the mobile device to implement battery management functions, the battery management functions including functions to:

provide a graphical user interface for battery management via a display and a user input element of the mobile device;

via the graphical user interface and while an operational configuration setting is currently applied to the mobile device:

receive inputs identifying different configuration settings of the mobile device from a user; and responsive to the user inputs, provide a dynamic battery use estimator by calculating and displaying to the user outputs of estimates of projected remaining battery life for the different configuration settings of the mobile device received as the user inputs, wherein the different configuration settings are not currently applied to the mobile device and are different from the operational configuration setting that is currently applied to the mobile device;

via the graphical user interface, provide a profile based battery manager for allowing a user to select one of a plurality of operational profiles of usage of the mobile device, each operational profile corresponding to a different configuration setting of the mobile device selected based on power consumption from a battery of the mobile device, wherein the plurality of operational profiles includes a user-defined operational profile that corresponds to a configuration setting saved by the user; and set the mobile device to operate in an operational configuration setting corresponding to the selected operational profile.

14. The article of manufacture of claim 13, wherein the plurality of operational profiles includes an operational profile learned by the mobile device, the operational profile corresponding to a configuration setting that is established by the mobile device based on usage patterns of the user over time.

15. The article of manufacture of claim 13, wherein the dynamic battery use estimator calculates the estimates of projected remaining battery life based on either real time or non-real time battery consumption information.

16. The article of manufacture of claim 13, wherein the battery management functions further include functions to:
provide a battery threshold manager for allowing the user to:
(a) select a trigger from among a plurality of triggers;
(b) select a condition for the selected trigger; and
(c) select at least one application, service or component of the mobile device impacting power consumption from a battery of the mobile device;
monitor operation of the mobile device in relation to the selected trigger;
determine whether or not the condition has been met; and
as a result of determining that the condition has been met:
notify the user that the condition has been met; and
turn off the selected at least one application, service or component of the mobile device.

17. The article of manufacture of claim 16, wherein the triggers are based on information including calendar settings, battery consumption levels of the mobile device, battery usage patterns of the mobile device, Radio Frequency (RF) signal strength for wireless communication by the mobile device, status of a connection of the mobile device to a network, and proximity information of the mobile device.

18. A mobile device comprising:
a wireless transceiver;
a battery;
at least one user interface element; and
a processor coupled to the at least one user interface element, the wireless transceiver and the battery, wherein the processor is configured to implement battery management functions, the battery management functions including functions to:
provide a graphical user interface for battery management via display and user input using the at least one user interface element of the mobile device; and
via the graphical user interface and while an operational configuration setting is currently applied to the mobile device:
receive inputs identifying different configuration settings of the mobile device from a user; and
responsive to the user inputs, provide a dynamic battery use estimator by calculating and displaying to the user outputs of estimates of projected remaining battery life for the different configuration settings of the mobile device received as the user inputs,
wherein:
the estimates are made for the different configuration settings that are not currently applied to the mobile device; and
the different configuration settings are different from the operational configuration setting that is currently applied to the mobile device.

19. The mobile device of claim 18, wherein the battery management functions further include functions to:
provide a battery threshold manager for allowing the user to:
(a) select a trigger from among a plurality of triggers;
(b) select a condition for the selected trigger; and
(c) select at least one application, service, or component of the mobile device impacting power consumption from a battery of the mobile device;
monitor operation of the mobile device in relation to the selected trigger;
determine whether or not the condition has been met; and
as a result of determining that the condition has been met:
notify the user that the condition has been met; and
turn off the selected at least one application, service, or component of the mobile device.

20. The mobile device of claim 19, wherein the battery management functions further include functions to:
provide a profile based battery manager for allowing the user to select one of a plurality of operational profiles of usage of the mobile device, each operational profile corresponding to a different configuration setting of the mobile device, wherein the plurality of operational profiles includes a user-defined operational profile corresponding to a configuration setting saved by the user; and
set the mobile device to operate in an operational configuration setting corresponding to the selected operational profile.

* * * * *